(12) United States Patent
de Queiroz et al.

(10) Patent No.: US 6,275,620 B2
(45) Date of Patent: Aug. 14, 2001

(54) METHOD AND APPARATUS FOR PRE-PROCESSING MIXED RASTER CONTENT PLANES TO IMPROVE THE QUALITY OF A DECOMPRESSED IMAGE AND INCREASE DOCUMENT COMPRESSION RATIOS

(75) Inventors: Ricardo L. de Queiroz, Pittsford; Reiner Eschbach, Webster; William A. Fuss; Robert R. Buckley, both of Rochester, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/731,584

(22) Filed: Dec. 7, 2000

Related U.S. Application Data (62) Division of application No. 09/206,487, filed on Dec. 7, 1998.

(51) Int. Cl.[7] .................................................. G06K 9/38
(52) U.S. Cl. .......................... 382/270; 382/233; 382/284; 358/462
(58) Field of Search .................................. 382/199, 166, 382/232, 233, 243, 250, 251, 270, 284, 176; 358/461, 456, 462; 375/240.08

(56) References Cited

U.S. PATENT DOCUMENTS

| | | | | |
|---|---|---|---|---|
| 5,331,442 | * | 6/1994 | Sorimachi | 358/462 |
| 5,416,855 | * | 5/1995 | Geiger | 382/199 |
| 5,778,092 | * | 7/1998 | Macleod et al. | 382/176 |
| 5,864,638 | * | 1/1999 | Ishizwa et al. | 382/270 |

* cited by examiner

Primary Examiner—Jon Chang
Assistant Examiner—Jingge Wu
(74) Attorney, Agent, or Firm—Michelle W. Waites; Mark Z. Dudley (57) ABSTRACT

An improved technique for processing a color or gray scale pixel map representing a document is disclosed. The pixel map is decomposed into a three-plane representation, a reduced-resolution "upper" plane, a reduced-resolution "lower" plane, and a high-resolution binary selector plane. The "upper" and "lower" planes contain the color or gray scale for the page as well as the continuous tone pictures that are contained on the page. The selector plane stores information for selecting from either the foreground plane or background plane during decompression. Information contained in the selector plane is first used to pre-process the upper and lower planes to reduce the amount of data on each of the other two planes that will be subjected to further processing. Each of the pre-processed planes is compressed using a compression technique optimal for the type of data that resides upon it.

6 Claims, 9 Drawing Sheets

| 0 | 1 | 2 | 3 | 4 | 5 | 6 | 7 |
|---|---|---|---|---|---|---|---|
| 1 | 2 | 3 | 4 | 5 | 6 | 7 | 8 |
| 2 | 3 | 4 | 5 | 6 | 7 | 8 | 9 |
| 3 | 4 | 5 | 6 | 7 | 8 | 9 | 10 |
| 4 | 5 | 6 | 7 | 8 | 9 | 10 | 11 |
| 5 | 6 | 7 | 8 | 9 | 10 | 11 | 12 |
| 6 | 7 | 8 | 9 | 10 | 11 | 12 | 13 |
| 7 | 8 | 9 | 10 | 11 | 12 | 13 | 14 |

METHOD AND APPARATUS FOR PRE-PROCESSING MIXED RASTER CONTENT PLANES TO IMPROVE THE QUALITY OF A DECOMPRESSED IMAGE AND INCREASE DOCUMENT COMPRESSION RATIOS

This application is a divisional of application(s) Ser. No(s). 09/206,487, filed Dec. 7, 1998.

FIELD OF THE INVENTION

This invention relates generally to image processing and, more particularly, to techniques for compressing the digital representation of a color document.

BACKGROUND OF THE INVENTION

Data contained in documents that has been scanned at high resolutions requires very large amounts of storage space. This data is typically subjected to some form of data compression in order to avoid the high costs that would be associated with storing it. "Lossless" compression methods such as Lempel-Ziv Welch (LZW) do not perform particularly well on portions of the document that are scanned pixel maps; "lossy" methods such as JPEG work fairly well on continuous-tone pixel maps, but they do not work particularly well on the parts of the document that contain text. To optimize image data compression, techniques, which can recognize the type of data being compressed, are needed.

One approach to satisfy the compression needs of differing types of data has been to use Mixed Raster Content (MRC) which involves separating a composite image—one having text intermingled with color or gray scale information—into three planes, and separately applying an appropriate compression technique to each plane. An approach such as this is discussed in U.S. Pat. No. 5,778,092 to MacLeod et al. issued Jul. 7, 1998, which discloses a technique for compressing a color or gray scale pixel map that represents a document. The pixel map is decomposed into a three-plane representation—a reduced-resolution foreground plane, a reduced-resolution background plane, and a high-resolution binary selector plane. The foreground plane contains the color or gray scale information of foreground items such as text. The background plane contains the color or gray scale information for the "background" of the page and the continuous tone pictures that are contained on the page. The selector plane stores information for selecting from either the foreground plane or background plane during decompression.

While the MRC technique has shown to be successful at separately processing planes, the segmentation process leaves data in both planes in the areas that will not be chosen by the selector plane. This often causes an increase in the number of bits that are required to encode the entire image, thereby decreasing its compression ratio. This results in inconveniences to the user of a printer, fax machine, scanner or other device in which the technique has been incorporated. For this reason, it is advantageous to somehow reduce the amount of data residing on each plane prior to processing. The present invention is directed to using the information that is contained in the selector plane to aid in reducing the amount of data residing on the foreground and/or background planes. More specifically, the invention takes advantage of the fact that when the selector plane designates a plane to provide information about a given pixel, the information on the other plane that pertains to the same pixel will not be used. The invention provides improved compression of the multi-plane image by treating this useless data in the described manner.

The following disclosures may be relevant to aspects of the present invention:

U.S. Pat. No. 5,251,271 to Fling issued Oct. 5, 1993 discloses a method for registering digitized multi-plane color images. The method designates one plane as the reference plane and registers each of the other warped planes with the reference plane. Each plane comprises pixels representing luminosity values having scalar x and y coordinates representing positions in the horizontal and vertical directions, respectively, of the plane. The planes are divided into regions. Correlation values are calculated for regions within the divisional region of the reference plane with a plurality of regions offset from the corresponding warped divisional region. A warp error value is calculated for each pixel of each divisional region as a function of the scalar offset. The warp error values are interpolated and added to the current position of each pixel of the warped plane.

Separate processing of various types of data contained in a document is disclosed in U.S. Pat. No. 5,060,980 to Johnson et al. issued Oct. 29, 1991 which describes a "form" that includes user modifiable fields and an encoded description of the location, size, type, etc. of the fields to allow for direct programming of a form interpreter. Other information including the processing of the form, encoded data, etc. may be included in the encoded information. A system for creating forms carrying an encoded description of selected attributes of the fields includes means for selecting or creating fields and locating the fields on a form while generating, substantially simultaneously, the encoded description of the selected attributes. A form composer then allows merging of the form and its encoded description for printing or electronic transmission. A system for reading such forms includes a scanner, decoding device, and processor. By reading such forms, data may be entered into or recalled from a data processing system, or a form interpreter may be programmed, locally or remotely, for subsequent handling of forms.

U.S. Pat. No. 5,784,175 to Lee, issued Jul. 21, 1998 discloses a video compression encoder process for compressing digitized video signals representing display motion in video sequences of multiple image frames. The encoder process utilizes object-based video compression to improve the accuracy and versatility of encoding interframe motion and intraframe image features. Video information is compressed relative to objects of arbitrary configurations, rather than fixed, regular arrays of pixels as in conventional video compression methods. This reduces the error components and thereby improves the compression efficiency and accuracy. As another benefit, object-based video compression of this invention provides interactive video editing capabilities for processing compressed video information.

U.S. Pat. No. 5,303,313 to Mark et al. issued Apr. 12, 1994 describes image compression based on symbol matching. An image is "pre-compressed" prior to symbol matching using run-length encoding. Symbols are then extracted from the run-length representation. A voting scheme is used in conjunction with a plurality of similarity tests to improve symbol matching accuracy. A template composition scheme wherein the template may be modified based on symbol matches is also disclosed.

Concurrently filed U.S. Patent Application by DeQueiroz et al. identified as attorney docket no. D/97636Q entitled "Iterative Smoothing Technique for Pre-Processing Mixed Raster Content Planes to Improve the Quality of a Decompressed Image and Increase Document Compression Ratios" and assigned to the assignee of the present invention discloses a method and apparatus for compressing a mixed raster content image that represents a color or gray scale document. The pixel map is decomposed into a three-plane representation—a reduced-resolution "upper" plane, a reduced-resolution "lower" plane, and a high-resolution binary selector plane. An iterative smoothing technique is then used to pre-process the upper and lower planes using the information contained in the selector plane, thereby reducing the amount of data that will be subjected to further processing.

All of the references cited herein are incorporated by reference for their teachings.

Accordingly, although known apparatus and processes are suitable for their intended purposes, a need remains for a method and apparatus that can efficiently process digital image data by separately compressing the various portions of a composite image.

SUMMARY OF THE INVENTION

In one embodiment of the invention, a method of compressing a pixel map representation of a document is disclosed, the method including the steps of creating a first image plane from the pixel map representation of a document, the first image plane containing color signals for a first subset of image data in the document; creating a second image plane from the pixel map representation of the document, the second image plane containing image signals for a second subset of image data in the document; creating a selector plane from the pixel map representation of the document, wherein the selector plane selects between the first subset signals and the second subset signals when decompressing the compressed pixel map representation of the document; and pre-processing the first image plane and the second image plane based upon data contained in the selector map.

In another embodiment of the invention an apparatus for processing pixel map representations of documents is disclosed, including: means for creating a first image plane from the pixel map representation of a document, the first image plane containing color signals for a first subset of image data in the document; means for creating a second image plane from the pixel map representation of the document, the second image plane containing image signals for a second subset of image data in the document; means for creating a selector plane from the pixel map representation of the document, wherein the selector plane selects between the first subset signals and the second subset signals when decompressing the compressed pixel map representation of the document; and means for pre-processing the first image plane and the second image plane based upon data contained in the selector map.

In the preferred embodiment of the invention, a program storage device tangibly embodying a program of instructions executable by a machine to perform method steps for compressing a document image is disclosed, wherein the method steps include: creating a first image plane from the pixel map representation of a document, the first image plane containing color signals for a first subset of image data in the document; creating a second image plane from the pixel map representation of the document, the second image plane containing image signals for a second subset of image data in the document; creating a selector plane from the pixel map representation of the document, wherein the selector plane selects between the first subset signals and the second subset signals when decompressing the compressed pixel map representation of the document; and pre-processing the first image plane and the second image plane based upon data contained in the selector map.

DESCRIPTION OF THE INVENTION

The present invention is directed to a method and apparatus for separately processing the various types of data contained in a composite image. While the invention is described in conjunction with a Mixed Raster Content (MRC) representation technique, those skilled in the art will recognize that it may be adapted for use with other methods and apparatus' and the invention is therefore, not limited to this description. The technique described herein is suitable for use in various devices required to store or transmit color or grayscale documents such as facsimile devices, image storage devices and the like. It should be noted that the examples and illustrations presented in the figures are in gray scale, but the same concepts apply to color documents and conversely, those portions of the invention that are described with reference to color documents apply equally to gray scale documents.

Figure 11:
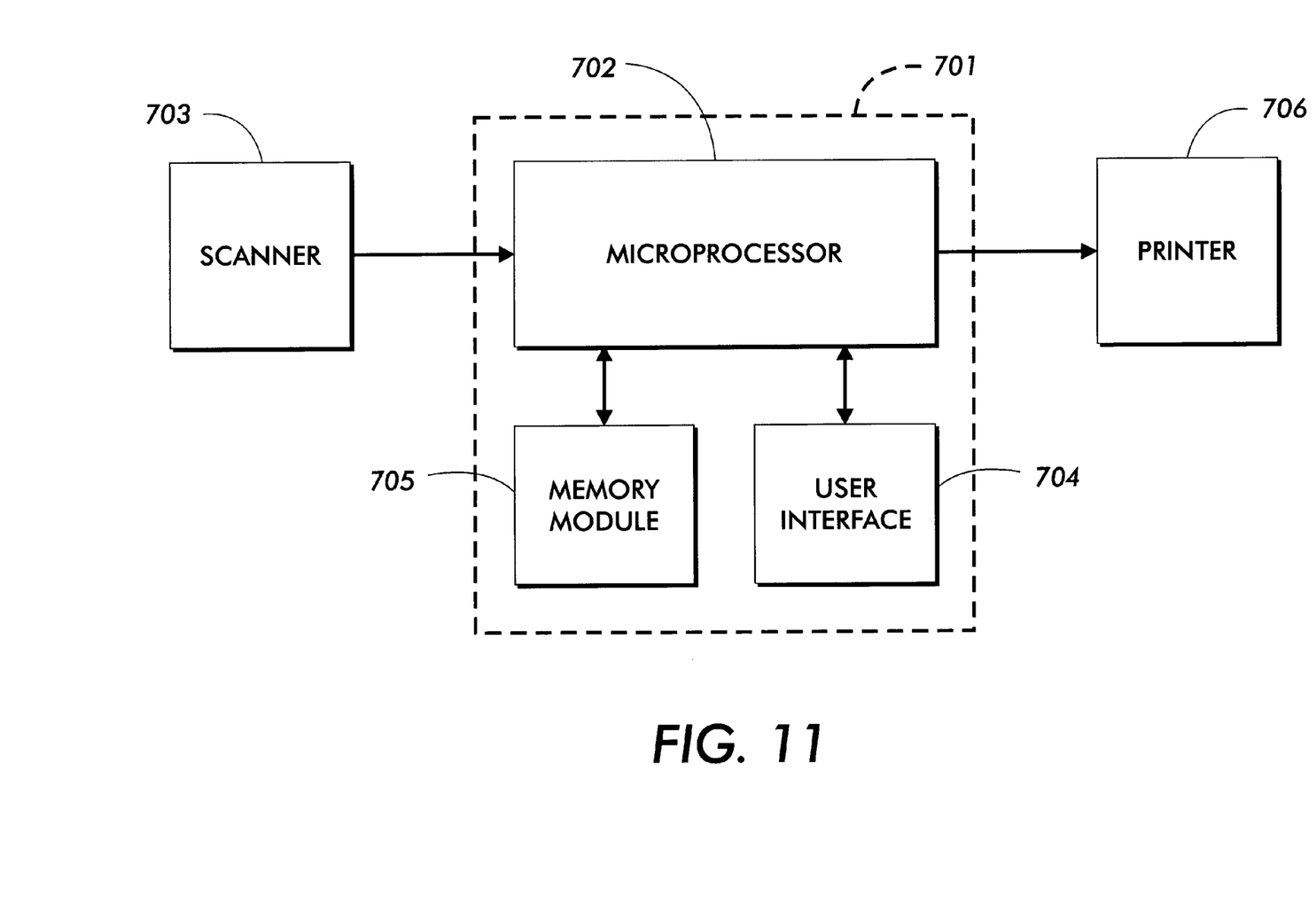
FIG. 11 illustrates a typical device in which the present invention may be implemented.

A pixel map is one in which each pixel represents some "value" which indicates the color or, in the case of gray scale document, how light or dark the image is at that point. As those skilled in the art will appreciate, most pixel maps have values that are taken from a set of discrete, non-negative integers. For example, a typical gray-scale pixel map might have values ranging from 0, representing black, to 255, representing the whitest tone possible. The pixel maps of concern in the currently preferred embodiment are representations of "scanned" images. That is, images which are created by digitizing light reflected off of physical media using a digital scanner. The term bitmap is used to mean a binary pixel map in which pixels can take one of two values, 1 or 0. An example of a device that may be used to obtain such scanned images is illustrated in FIG. 11.

Figure 1:
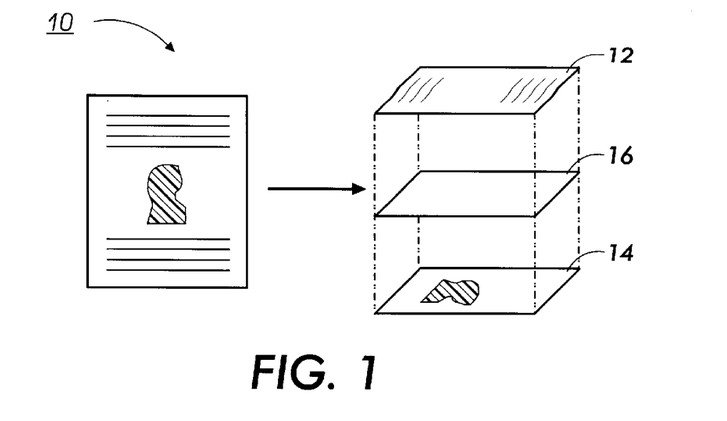
FIG. 1 illustrates a composite image and includes an example of how such an image may be decomposed into three MRC image planes, an upper plane, a lower plane, and a selector plane.

Turning now to the drawings for a general description of the invention, as indicated in FIG. 1, pixel map 10 representing a color or gray-scale document is preferably decomposed into a three plane page format. The document format is comprised of an upper plane 12, a lower plane 14, and a selector plane 16. Upper plane 12 and lower plane 14 are typically stored at the same bit depth and number of colors as the original pixel map 10, but usually at reduced resolution. However as those skilled in the art will appreciate, the processing of planes can include a reduction in the bit depth or a palette color encoding. It is important to recognize that while the terms "upper" and "lower" are used to describe the planes on which data resides, it is not intended to limit the invention to any particular arrangement. Further, it is also possible to practice the invention with planes that are composed of multiple superimposed separations. If this is the case, it is possible to apply the present invention to all separations together or to each color separation individually.

Processing typically occurs on a block by block basis, rather than by simultaneously processing all the image data. For example, if JPEG compression will be applied, 8×8 blocks must be provided. That is, the image data must be separated into groups of 64 pixels, with 8 pixels extending in the horizontal direction and 8 pixels extending in the vertical direction. JPEG is merely an example of one compression format that may be used with the present invention. The blocks may be organized in another configuration if required by the technique that will be used. After all blocks are processed, any or all three planes may be compressed using a method suitable for the type data residing thereon. Continuing with the example already provided, upper plane 12 and lower plane 14 may be compressed and stored using JPEG, while selector plane 16 is compressed using a symbol-based compression format. It would be apparent to one of skill in the art to compress and store the planes using other formats that are suitable for the intended use of the document. For example, in the Color Facsimile arena, group 4 (MMR) would preferably used for the selector plane, since the particular compression format used must be one of the approved formats (MMR, MR, MH, JPEG, JBIG, etc.) for facsimile data transmission.

Lower plane 14 commonly contains both information that is pertinent to the background color of the page (including the color of tints, washes, etc.) and the continuous-tone pictures that are found on the page. Upper plane 12 commonly contains the "ink colors" of foreground items such as text. Selector plane 16 is typically stored at higher resolution than the upper and lower planes. Selector plane 16 is used to describe, for each pixel in the selector plane, whether to use the pixel value found in the lower plane or the upper plane during image reconstruction. If a "white" pixel in the selector plane (i.e. a logical zero value) means the pixel value should be taken from the corresponding pixel from the lower plane, a "black" pixel in the selector plane (i.e. a logical one value) means that the pixel value should be taken from the corresponding pixel from the upper plane.

Figure 2:
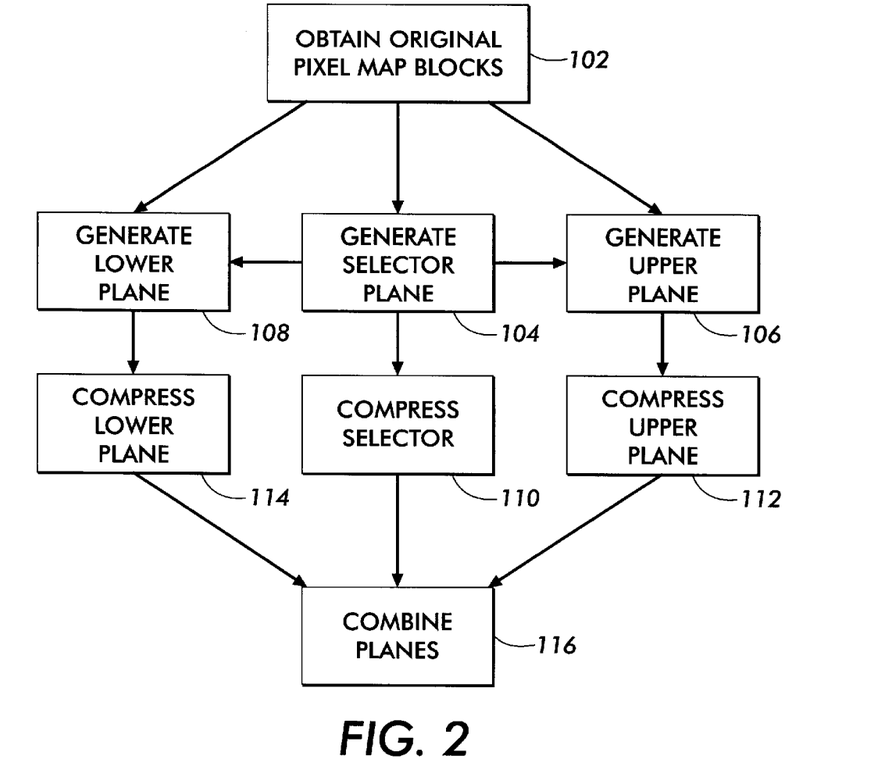
FIG. 2 contains a flowchart illustrating the basic steps for compressing a document according to the present invention.

FIG. 2 contains a flowchart depicting the basic steps for compressing a document using an embodiment of the present invention. Blocks from an original pixel map 10—a pixel map representation of the original document to be compressed—are first obtained as indicated in step 102. This may be through scanning an original, by retrieving a stored pixel map representation of the document, or by converting an electronic or page description language representation of an original document into a pixel map representation. Pixel map 10 representation is then analyzed to generate the information for the three planes as indicated in steps 104–108. Selector plane 16 is implicitly or explicitly computed first, as indicated in step 104 and is used to create the other planes. Those skilled in the art will recognize that use of the phrase "implicitly or explicitly" refers to the fact that the invention does not require actual calculation and generation of selector plane 16. While selector plane 16 can be generated, the invention may be accomplished by simply moving pixels from one plane to another, and marking the pixels that have been moved. Technically, this calculates one plane such as lower plane 14 first, but simultaneously it implicitly calculates selector plane 16.

Selector plane 16 is typically a bitmap computed using a technique suitable for finding text or the like on original pixel map 10. What results is a bitmap where pixels have a 1 value where they represent text and a 0 elsewhere. It should be noted that the term "text" refers to page objects that have text properties, such as sharp, high contrast edges, etc., including many other objects that to not qualify as "readable" text. Pixels are placed on either upper plane 12 or lower plane 14 according to the data on selector plane 16.

An upper plane 12, typically stored at a reduced resolution relative to original pixel map 10, contains color (or gray scale) information of upper items such as text is computed using selector plane as indicated in step 106. Briefly, creating upper plane 12 involves creating an image containing the color of the objects (pixels) selected in the selector plane. Conceptually, the method can be viewed as pouring ink contents of the upper plane through a mask located on the selector plane onto the background of the lower plane. The ink colors are placed in a reduced-resolution "ink map" that will ultimately become upper plane 12. Without the present invention, the empty values are typically filled in with pre-computed ink colors.

A lower plane 14, also typically stored at a lower resolution than original pixel map 10, is then computed as indicated in step 108. In this step, one embodiment of the invention includes an image segmentation process that identifies the "image" or non-text portions. This information is used to create the reduced resolution lower map, which contains background color information as well as continuous tone image information. The result is an image that has all small, text-like features deleted, but which includes tints as well as color or gray scale data.

Once the three planes have been generated, either or all of them may be compressed at steps 110–114 using a technique suitable for compressing the type of data that lies thereon. The compressed data representing each plane can be recombined at step 116, after the necessary compression has taken place, in order to create a single representation of the data, for storage in a computer file, or transmission in a single channel. If case multiple transmission channels are available step 116 may not be necessary.

Figure 3:
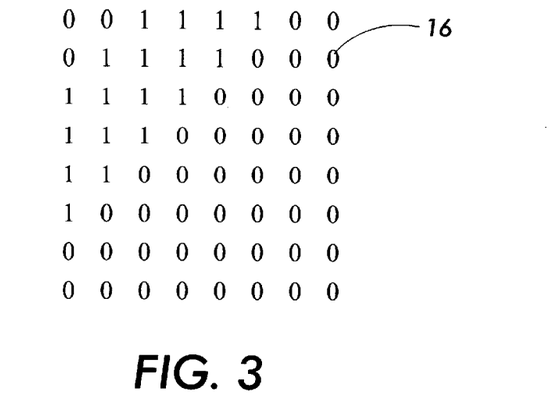
FIG. 3 shows a detailed example of the typical contents of a selector plane for an 8×8 block of pixels.

The present invention includes a method and apparatus which pre-processes the data on upper plane 12 and lower plane 14 using the information contained on selector plane 16. Turning now to FIG. 3, as stated earlier selector plane 16 includes a pattern of zeros and ones, dispersed in an 8×8 block. An 8×8 block such as that illustrated here corresponds to an 8×8 block of data that is provided by the compressor which, in the preferred embodiment of the invention, will be a JPEG compressor. If a compression technique that provides data in another configuration is used, selector plane 16 will have the zeros and ones placed thereon, dispersed in a corresponding pattern. As stated earlier, it is assumed here that a 0 on selector plane 16 means that the pixel value should be taken from the corresponding pixel from the lower plane 14, while a 1 on the selector plane means that the pixel value should be taken from the corresponding pixel from upper plane 12.

In the preferred embodiment of the present invention, when processing image planes that will be reduced for compression, the block size used in the pre-processing step may be enlarged to compensate for the reduction in image size, so that the final processed block size matches the block size used for compressing the image plane.

Figure 4:
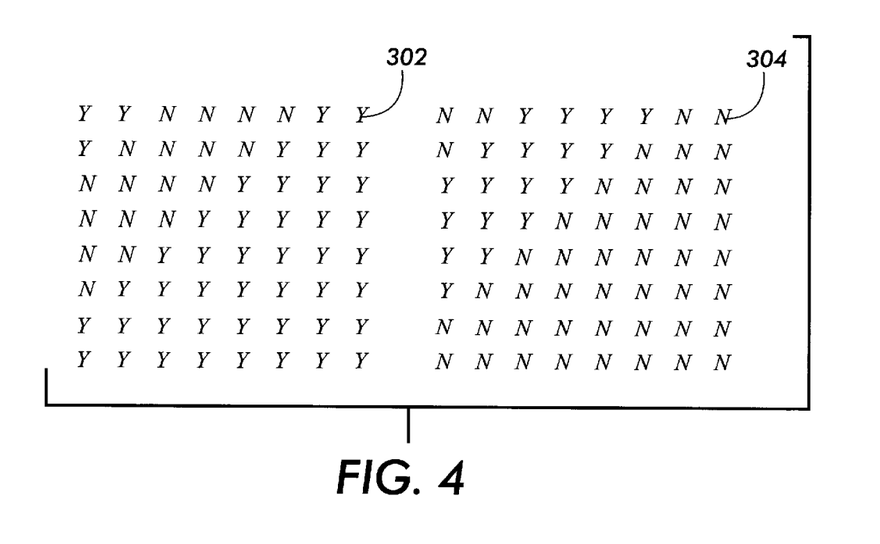
FIG. 4 shows a detailed example of an image plane map which corresponds to the selector map of FIG. 3.

Referring now to FIG. 4, image plane maps that identify the pixels in each block that will be used to reconstruct the final output image from the two planes is next created. For lower plane 14 map 304, is created wherein an "N" is placed in every location in which a 1 was located on selector plane 16 to mark the pixels in the block that will not be used during image reconstruction. A "Y" is placed in those locations in which 0's were located on selector plane 16 to show the pixels in the block that are to be retained for the output image. Similarly, for upper plane 12, map 302 is created and N's are placed in those locations which correspond to 0's on selector plane 16, while Y's are placed in the locations that correspond to 1's. Those skilled in the art will recognize that the second map generated may be created by simply inverting the first map.

Figure 5:
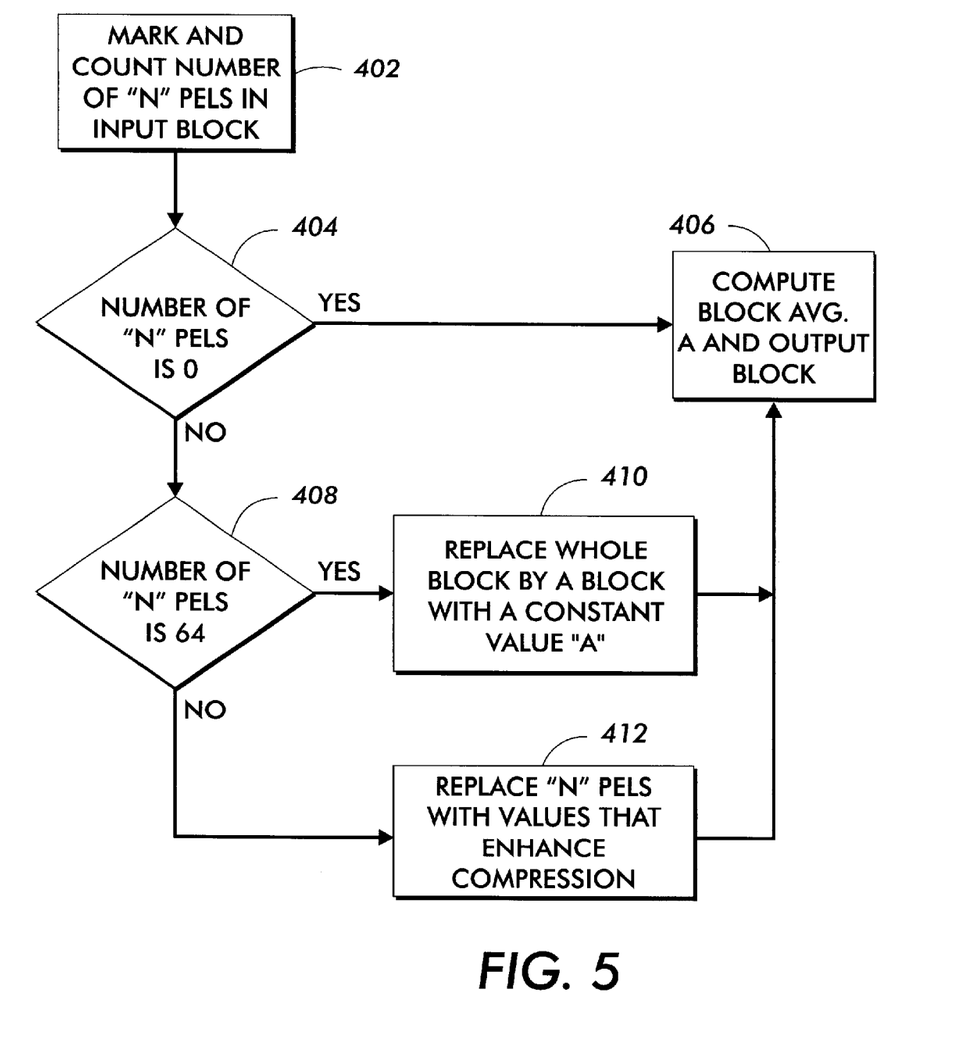
FIG. 5 depicts one embodiment of the present invention for pre-processing image planes.

In one embodiment of the invention, referred to as non-destructive processing, retained ("Y" labeled) pixels are never modified. As indicated in FIG. 5, the first step 402 is to determine the number of locations in the block in the image plane map 302 or 304 that have been identified as disposable ("N" pixels). For simplicity, the invention will continue to be described with reference to a block in the lower plane 14. As shown in step 406, if no locations in image plane map 304 have been identified as N locations, the block is simply output as is. Note that the average "A" of the block is implicitly or explicitly computed before it is output in step 406. Those skilled in the art will recognize that average "A" could be obtained by be re-using the DC term of the JPEG compression, and that while an explicit calculation may occur, it is not necessary. On the other hand, if all locations in image plane map 304 have been identified as N locations, all of the pixels in the block that lie on lower plane 14 can be set to a constant value. In one embodiment of the invention, the constant value is set equal to the average of all pixels values in the previously processed block, i.e. set to "A". Those skilled in the art will recognize that numerous methods can be used to calculate the most appropriate constant value, and that the invention is not limited to using this average. Lower plane 14 with its newly assigned values is then output at step 406.

With continued reference to FIG. 5, if neither all nor none of the pixels on image plane map 304 in the block being processed have been identified as N pixels (i.e. the number of N identified pixels is not equal to either zero or the maximum value which, in the case of JPEG compression would be 64) all of the pixels in the block that correspond to Y locations on image plane map 304 are replaced with values that will enhance the compression of the block. Specifically, values placed on lower plane 14 will be those that will minimize the amount of data that will be generated during image compression. In the preferred embodiment of the invention, these values will be provided using an iterative image smoothing technique, which will be described in detail later (See FIG. 8 and corresponding discussion). Lower plane 14 with its newly updated values is then output at step 406.

It is important to understand that even in the non-destructive case, artifacts can occur during decompression that are caused by pixel values at N locations. Assume for simplicity that all Y pixels have a value of 200. Filling all N pixels with value 55 will produce a ringing artifact that protrudes into the area of Y-marked pixels. It is therefor necessary and one intention of this invention, to use values for the N-marked pixels that optimize compression while not introducing artifacts in the Y-marked regions on decompression.

Figure 6:
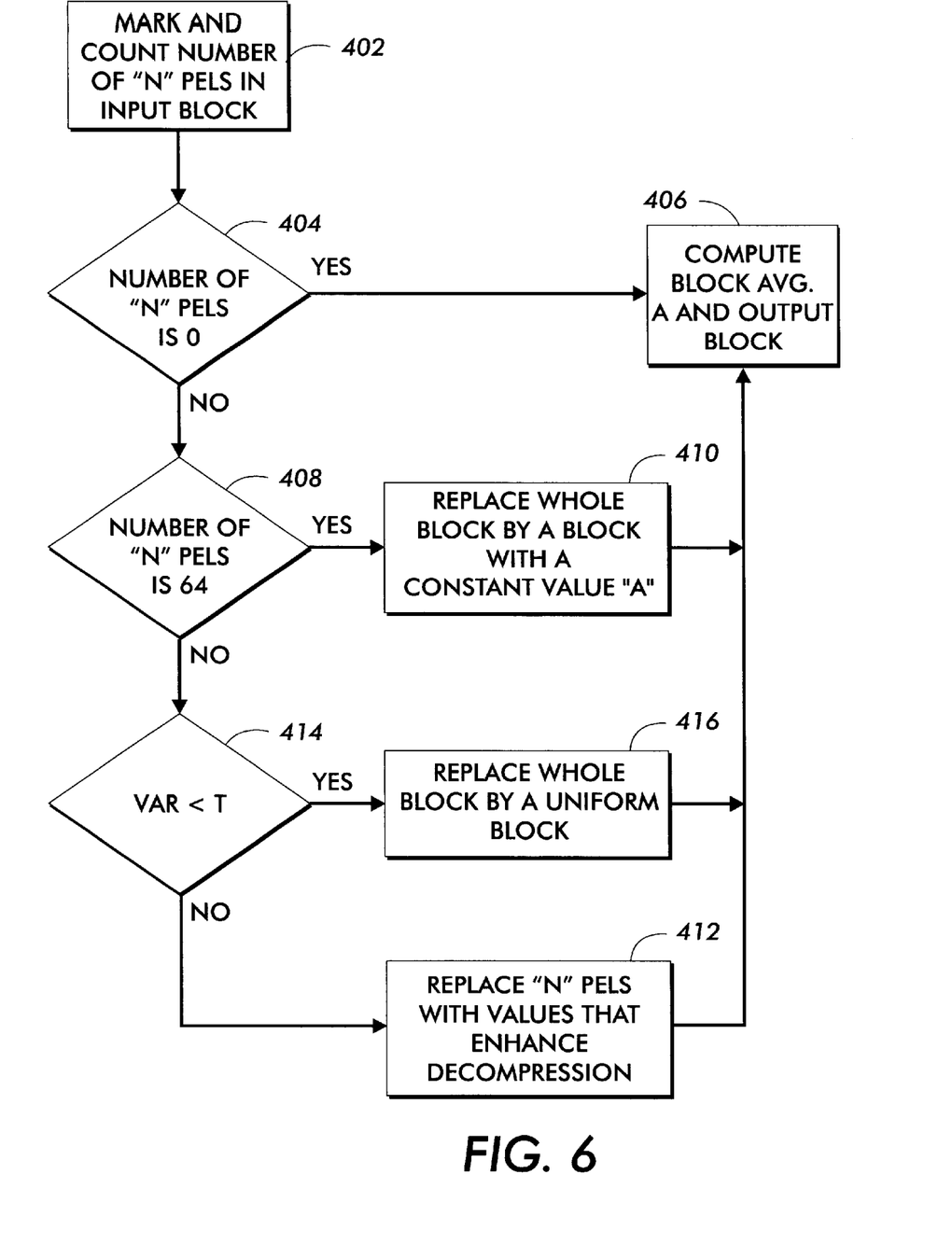
FIG. 6 illustrates another embodiment of the present invention for pre-processing image planes.

Turning now to FIG. 6, in another embodiment of the invention a "near non-destructive processing" technique is used to process image data according to the present invention. The phrase "near non-destructive is used to indicate that some of the Y labeled pixels in the block are likely to be slightly modified using this approach. Near non-destructive processing is generally accomplished by determining how much variance there is between the Y labeled pixels on the image plane and then comparing that variance to some pre-determined threshold value. If the variance of the Y labeled pixels is small enough, processing time can be reduced by replacing the entire image data block with a block of pixels that has a uniform value. Thus, the embodiment first requires inputting threshold and computing the variance of the block. The threshold value indicates the maximum amount of distortion that is acceptable for decompression. The variance indicates the activity of the block—whether there are large variations in the type (i.e. text, pictorial) of image data within the given block.

As before, the process begins by determining the number of locations in the image plane map 304 for which the block has N identified pixels, as indicated in step 402. If no locations in the block have been identified as N pixels, the block is output in step 406 and as before, if all locations in the block have been identified as N pixels in image plane map 304, all of the pixels in the block are replaced at step 410 with pixels that have a constant value such as the average value for pixels in a previously processed block, or some other appropriate value.

Near non-destructive processing may be applied if image plane map 304 has neither all N marked pixels or all Y marked pixels. If this is the case, processing of the image is dependent upon the relationship between the variance and the threshold described above and illustrated in step 414. If the variance is greater than or equal to the threshold, all pixels in lower plane 14 that are in locations which correspond to those identified with N's on image plane map 304 are again replaced with values that will enhance compression. As before, the preferred embodiment of the invention includes calculating these values using an iterative image smoothing technique such as the one described below. The block will then be output at step 406.

If the variance is less than the threshold, the entire block will be replaced by a uniform block with pixels that have a constant value as indicated in step 416. It should be noted here that the constant value used at step 416 will typically not be the same as that which would have been used if all of the pixels had been marked with N (step 410). While minimizing the amount of data that will be generated during image decompression is still the goal in this step, a different averaging technique will often be required to accomplish that task. In the preferred embodiment of the invention, the average of the pixels corresponding to locations marked with Y's will be calculated and that value will be the constant used in step 416. Again, those skilled in the art will recognize that numerous methods may be used to calculate the most appropriate constant value and the invention is not limited to this embodiment.

As explained earlier, in the preferred embodiment the present invention will be implemented using JPEG compression to compress upper plane 12 and lower plane 14. Thus, a simplifying method can be applied by incorporating the present invention within the JPEG compression module.

Figure 7:
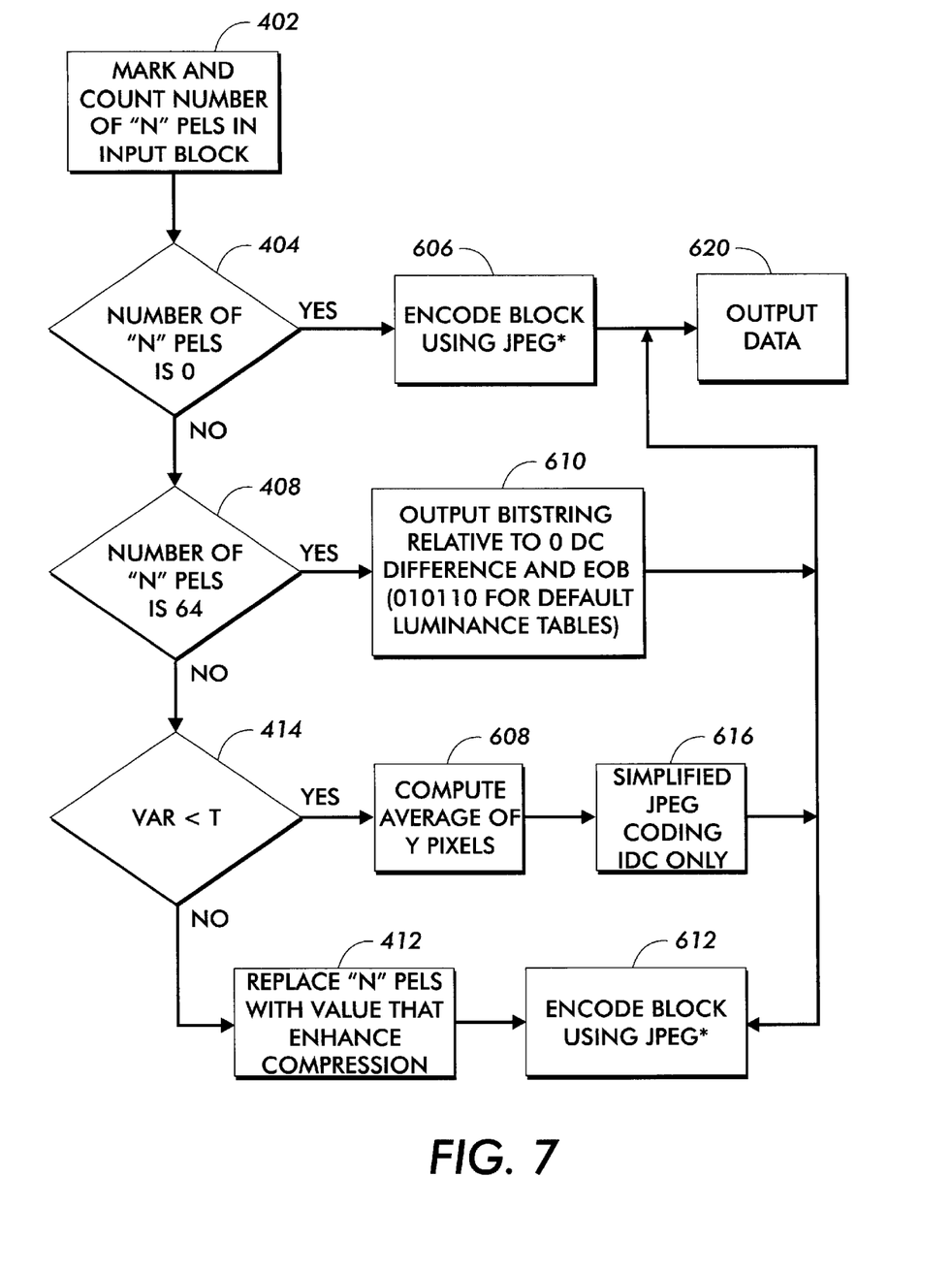
FIG. 7 shows the manner in which a near non-destructive embodiment of the present invention may be used in conjunction with a JPEG compression system to pre-process image planes for subsequent JPEG compression.

An implementation of this embodiment is provided in FIG. 7. As stated above, the process begins by determining the number of N locations in the image plane map 304 for the block at step 402. If there are no N locations in the block, the block is still output as before, the difference here being that, as shown in step 606, output 620 is preceded by JPEG encoding. Thus the output module 620 actually outputs a variable amount of bits generated by the JPEG compression process.

If all locations in image plane map 304 for the block have been identified as N pixels, the JPEG compliant bitstring relative to the 0 DC difference is output, followed by an end of block symbol. When decoding the image data, those two symbols indicate that the current block is uniform and has the same average as the previously coded block. This bitstring will be 010110 for default luminance tables as indicated in step 610 and is perhaps the shortest possible valid string to represent a block in JPEG. The resulting data block plane will again be output at step 620. The motivation for using the average of the previous block as opposed to the current one is now clear since by using this method, the amount of JPEG compressed data for the block being processed will be minimal.

Still referring to FIG. 7, assuming the near non-destructive processing method is being used, the next step occurs when neither all nor none of the pixels on image plane map 304 has been identified as N pixels. What takes place during this next step again depends upon the relationship between the variance and the threshold described above. Looking first at step 414 if the variance is greater than or equal to the threshold, all pixels in the plane in locations which correspond to those identified with Y's on image plane map 304 are replaced with values that will enhance decompression (i.e. minimize the amount of generated data). Again, in the preferred embodiment of the invention, this will be an iterative smoothing technique. The "smoothed" block is then compressed using JPEG at step 612, and the compressed data bits are output at step 620.

If the variance is less than the threshold, the plane will be replaced by a uniform block of pixels at step 608. In one embodiment of the invention, the value of the uniform block will be equal to the average of pixels in the block that have been marked with Ys in image plane map 304. Output using simplified JPEG encoding will take place at step 616. Use of the term "simplified" JPEG encoding means that the block average is used as the DC value of the discrete cosine transform (DCT) which is the only DCT value to be encoded and output. Therefore, the DCT computation and the quantization or encoding of DCT AC values for the block do not take place.

Figure 8:
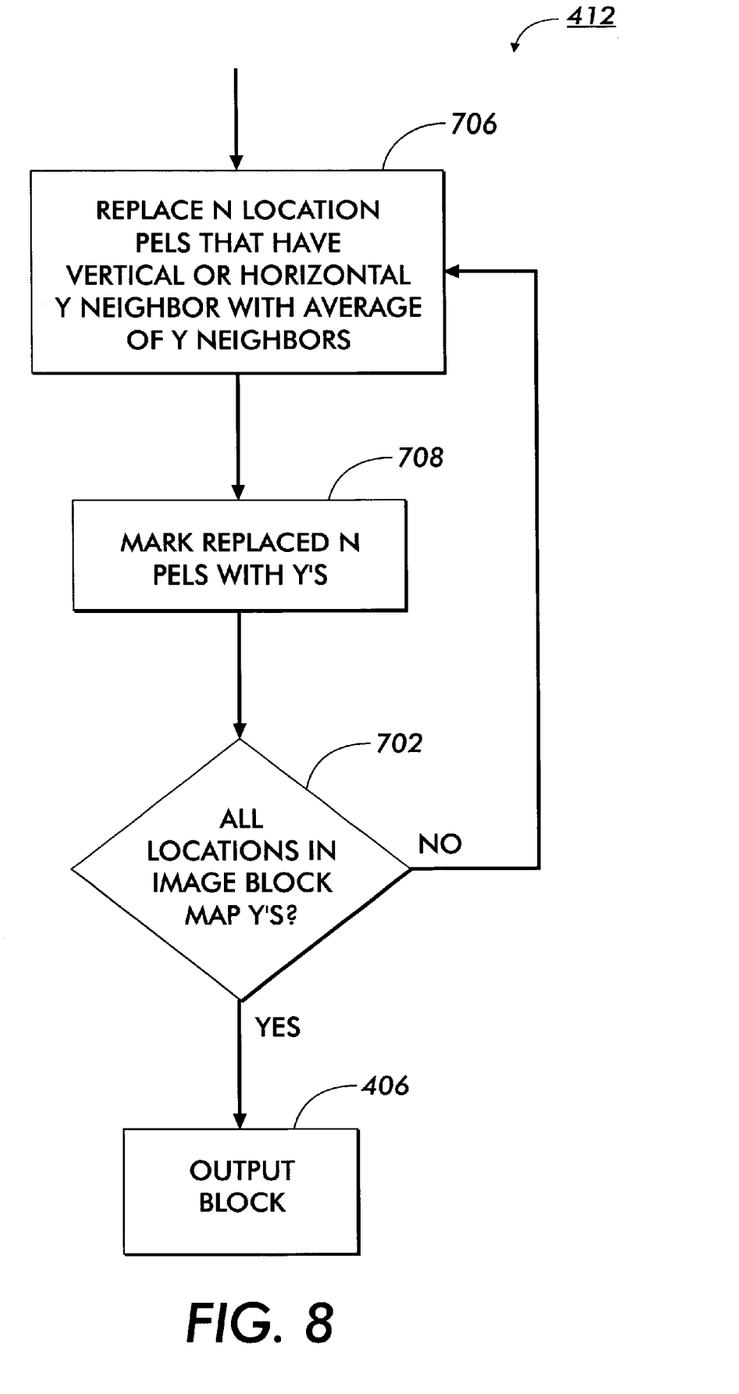
FIGS. 8–10 contain detailed illustrations of an iterative smoothing technique that may be used in conjunction with the present invention.

Referring now to FIG. 8, the details of one embodiment of an iterative image smoothing technique, step 412 in FIGS. 5, 6 and 7 will now be described. As indicated above, one way to enhance compression is to replace the N pixel values in the block with values that will compress better, since those values will not be used during reconstruction anyway.

The fact that iterative smoothing is being applied means that there are initially at least some N's on the map. Those N locations that have at least one vertical or horizontal Y neighbor are noted. It should be pointed out that diagonal neighbors are not counted during this part of the process. Next, the values of all pixels in the block that correspond to the selected N locations will be replaced by the average of all of their neighboring pixels that correspond to previously identified Y locations as indicated in step 706. Diagonal as well as vertical and horizontal neighbors may be included in this averaging. The replaced pixels are identified with Y's in corresponding locations in image plane map block 304 as indicated in step 708. The status of map 304 is checked at step 702 to determine whether all locations in image plane map 304 that correspond to locations in the block are identified with Y's. The process is repeated until this is the case (i.e. until there are no more N's on image map 304 in locations that correspond to those in the block). Once no more N locations the block is output as indicated in step 406.

Figure 9:
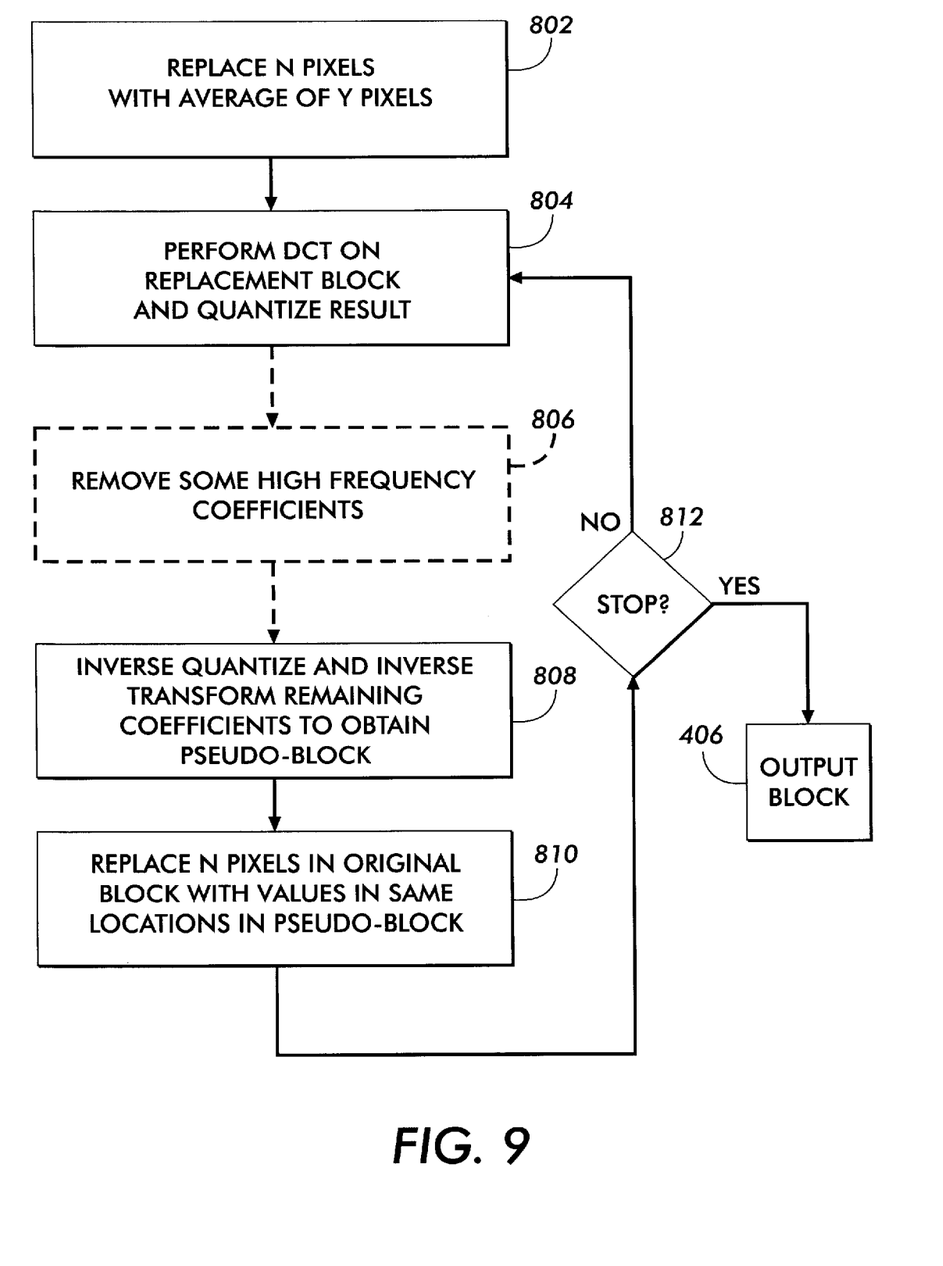

Turning now to FIG. 9, another way to perform iterative smoothing for step 412 is to use a discrete cosine transform. As before, N locations that have at least one vertical or horizontal Y neighbor replaced by the average of all of pixels that correspond to Y locations as indicated in step 802. A discrete cosine transformation (DCT) is then applied to this new block, and the results of the transformation are quantized as indicated in step 804.

In one embodiment of the invention, some of the high frequency coefficients are removed at step 806. It is anticipated that several iterations will occur before this process has been completed. How many levels of high frequency coefficients that are removed will depend upon how many iterations have occurred, with the number of levels removed in direct proportion to the number of iterations.

Figure 10:
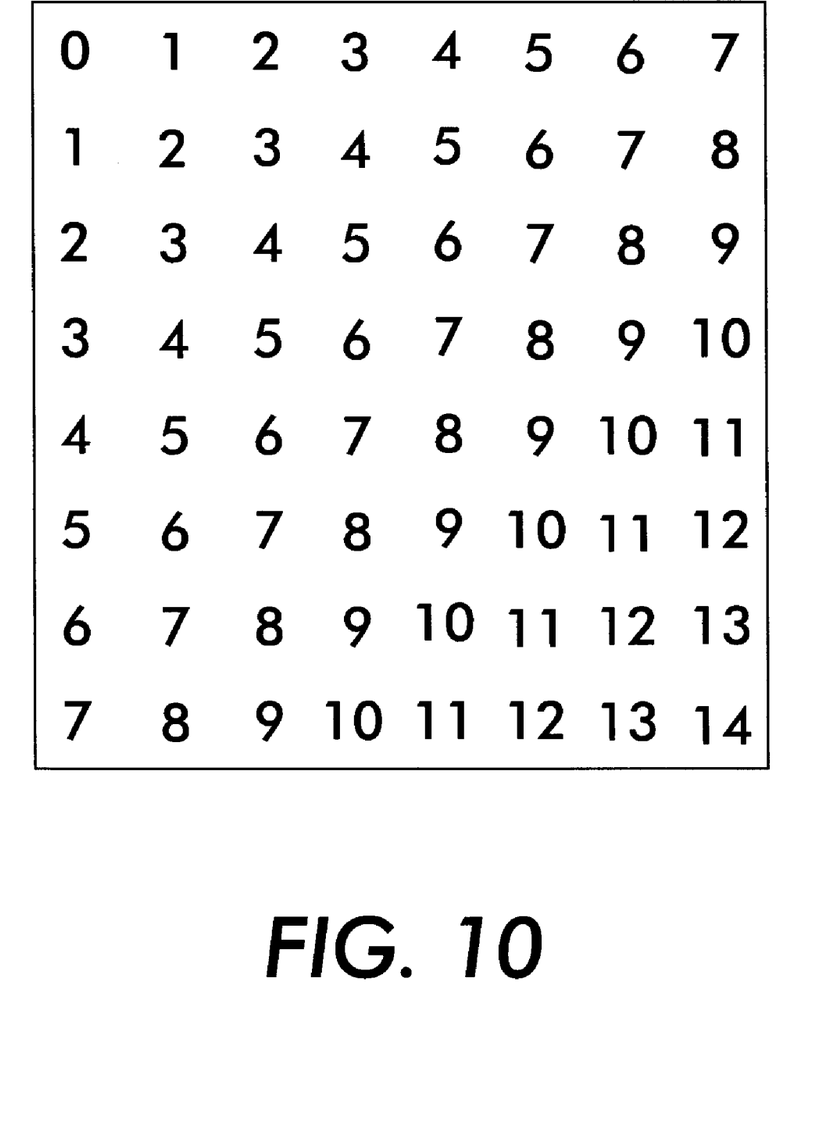

Turning for a moment to FIG. 10, an 8×8 block which describes frequency "levels" is provided. As shown, the 0 level coefficient is the DCC. The first level coefficients are marked by 1's, second level coefficients marked by 2's, third level marked by 3's etc., until coefficients in all 14 levels are identified. Thus, when it is desired to use only the first level coefficients, three pixel values will be provided—those values marked with numbers less than or equal to 1. If the fourth level coefficients are to be used, fifteen pixel values, those marked with numbers less than or equal to 4, will be used.

Turning back to FIG. 9, in another embodiment of the invention, step 806 is skipped, and all coefficients produced by the DCT are used for subsequent processing.

Next, the plane is subjected to inverse quantization and inverse DCT to produce a pseudo-plane as indicated in step 808. As indicated in step 810, the pixel values in the original plane that correspond to N locations in image plane map 304 are then replaced with pixels in the same locations in the pseudo-plane. As indicated earlier, this is an iterative process and it is repeated until a designated criteria is met, as shown in step 812.

In one embodiment of the invention, the process is repeated for a fixed number of iterations. An example of this embodiment is to perform processing only once (stop when K=2) and the results of that single iteration can be used. In another embodiment, processing stops after a comparison of either Y or N identified pixels in consecutive iterations takes place, and it is determined that a designated amount of improvement or change has occurred.

Turning again to FIG. 2, once each of the respective planes is generated, they are each compressed using a suitable compression technique, step 112. In the currently preferred embodiment, upper plane 12 and lower plane 14 are compressed using JPEG while the selector plane 16 is compressed using a symbol based pattern matching technique such as CCITT Group 4 or a method of classifying scanned symbols into equivalence classes such as that described in U.S. Pat. No. 5,778,095 to Davies issued Jul. 7, 1998, the contents of which are hereby incorporated by reference.

While this invention has been described in terms of compressing a pixel map that is represented as a selector plane and two image planes, those skilled in the art will recognize that it can be adapted to compress a pixel map that is represented as a selector plane and a single image plane. A pixel map representation such as this may include an image with an associated mask, where the mask is used to select an irregularly shaped area from the image. In a representation such as that described, the image pixels not selected by the mask correspond to N locations in the image plane and can be processed by any of the methods described in the present invention to increase the compression ratio of the single image plane and improve the quality of the decompressed image.

In the preferred embodiment of the invention, any or all of these methods may be implemented in a computer any other device capable of storing a set of instructions which may be executed by a machine. The program storage device will tangibly embody this set of instructions (most often referred to as a software program) to perform the above previously recited steps for compressing a document image in the manner described in detail above with reference to the attached figures. For example, as illustrated in FIG. 11, a computer 701 includes a microprocessor 702, user interface 704, and memory module 705. The computer 701 may be coupled to a scanner 703 and printer 706.

In summary, the present invention uses the selector plane to replace, for each plane, pixels that have been designated to be provided by the other plane by carefully chosen values. The previously existing data is completely ignored, and the newly chosen values are calculated for such that the number of bits that will be generated during the subsequent compression is minimized. While the present invention has been described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

What is claimed is:

1. A method of processing a pixel map representation of a document, comprising the steps of:
   a) obtaining a set of image data signals which represent light intensity in a portion of a digital image;
   b) creating a selector plane from said image data signals which separates said signals into subsets;
   c) creating a first image plane using said selector plane and said image data signals, wherein said first image plane contains a first subset of image data signals;
   d) creating a second image plane using said selector plane and said image data signals, wherein said second image plane contains a second subset of image data signals; and
   e) processing at least one of said first image plane and said second image plane based upon data contained in said selector plane, wherein said processing step further comprises the steps of:
      inputting a threshold signal, which indicates an acceptable level of distortion for a subsequent processing operation;
      inputting a variance signal, which indicates an average magnitude between an image data signal and an average value of all signals in said subset;
      generating an image plane map which identifies locations in an associated image data subset in which image data signals that shall be used to reconstruct said digital image reside; and
      replacing all image data signals on said image plane map that correspond to associated subset locations not identified for image reconstruction with image data signals which have values that will enhance said image reconstruction and outputting said subset if said variance signal is greater than or equal to said threshold signal and at least one, but fewer than all locations in said image plane map associated with said subset have been identified for said image reconstruction.

2. A method of processing a pixel map as claimed in claim 1 wherein said values that will enhance said image reconstruction further comprise image signals that will minimize an amount of data generated during a said image reconstruction.

3. A method of processing a pixel map as claimed in claim 1 wherein said values that will enhance said image reconstruction are obtained using an iterative smoothing technique that includes processing said image data plane one or more times, gradually altering magnitudes of image data signals in said subset that do not correspond to locations on said image data plane map that have been identified for image reconstruction each time said subset is processed to calculate new replacement values for said subset image data signals that have not been identified for image reconstruction.

4. A method of processing a pixel map as claimed in claim 1 wherein said processing step further comprises the steps of:
   a) inputting a threshold signal, which indicates an acceptable level of distortion for a subsequent processing operation;
   b) inputting a variance signal, which indicates an average magnitude between an image data signal and an average value of signals in said subset;
   c) generating an image plane map which identifies locations in an associated image data subset in which image data signals that shall be used to reconstruct said digital image reside;
   d) outputting an image plane associated with said subset if said image plane map indicates that all image data signals in said subset shall be used for said image reconstruction;
   e) replacing said image data subset associated with said image plane map with a subset of signals that have a constant value and outputting said constant signal subset, if no locations on said image plane map have been identified for said image reconstruction;
   f) replacing all image data signals on said image plane map that correspond to associated subset locations not identified for image reconstruction with image data signals which have values that will enhance said image reconstruction and outputting said image plane map associated subset if said variance signal is greater than or equal to said threshold signal and at least one, but fewer than all locations in said image plane map associated with said subset have been identified for said image reconstruction; and
   g) replacing said image data subset with a plane of image data signals that have a uniform value and outputting said uniform signal subset if said variance signal is less than said threshold signal and at least one, but fewer than all locations on said image plane map have been identified for said image reconstruction.

5. A method of processing a pixel map as claimed in claim 4 wherein said constant value of signals on said constant value plane is equal to an average of all image signals in an immediately previously processed image plane.

6. A method of processing a pixel map as claimed in claim 4 wherein said values that will enhance said image reconstruction are obtained using an iterative smoothing technique that includes processing an image plane map associated subset one or more times, gradually altering magnitudes of image data signals in said subset that do not correspond to locations in said image data plane map that have been identified for image reconstruction each time said subset is processed to calculate new replacement values for said image data signals that correspond to locations in said image data plane that have not been identified for image reconstruction.

* * * * *